Sept. 8, 1964  J. E. HILL ETAL  3,148,084
PROCESS FOR MAKING CONDUCTIVE FILM
Filed Aug. 30, 1961  4 Sheets-Sheet 1

FIG.1

INVENTORS
JAMES E. HILL
RHODES R. CHAMBERLIN
BY

THEIR ATTORNEYS

INVENTORS
JAMES E. HILL
RHODES R. CHAMBERLIN

THEIR ATTORNEYS

United States Patent Office 3,148,084
Patented Sept. 8, 1964

3,148,084
PROCESS FOR MAKING CONDUCTIVE FILM
James E. Hill and Rhodes R. Chamberlin, both of Dayton, Ohio, assignors to The National Cash Register Company, Dayton, Ohio, a corporation of Maryland
Filed Aug. 30, 1961, Ser. No. 135,036
14 Claims. (Cl. 117—211)

This invention is concerned with a process for forming thin homogeneous inorganic films. It generally relates to a novel process for producing electroconductive and more specifically semiconductive and photoconductive films and layers disposed on a support, and to the coated support prepared by said process. More particularly, this invenution relates to a novel process for providing homogeneous microcrystalline semiconductive and photoconductive films on a base material, the process consisting essentially of spraying a solution of the desired elements onto a heated base material or support, and to the novel article with improved semiconductive characteristics produced by said process.

The process of this invention is particularly attractive from a manufacturing and economic standpoint because it is simple to operate, efficient, versatile, and economical in comparison to the present-art-recognized methods of forming semiconductive layers. In general, the process of this invention consists of heating a heat-resistant substrate, such as a glass plate, to a temperature ranging from about 200 degrees Fahrenheit to about 700 degrees Fahrenheit, the temperature depending on the type of film and on the characteristics thereof desired, and spraying thereon a solution of elements capable of forming a semimconductive film. Of particular interest are those elements which, because of inherent characteristics, form photoconductive semiconductor films when applied to a selectively heated substrate in accordance with the process of this invention, which process will hereinafter be described in more detail. For example, soluble salts of elements such as sulfur and selenium, from group VIA of the periodic chart of the elements, when sprayed in accordance with this invention with soluble salts of elements such as cadmium and zinc, appearing in group IIB of the periodic chart, provide photoconductive semiconductor films having excellent optical and electrical characteristics. As will be made apparent below, the invention is not limited to soluble elements selected from the groups mentioned above; soluble elements from other groups have been used in various combinations in the process of this invention to provide semiconductive coatings with unusual and advantageous characteristics.

As used herein, the terms "group" and "groups" of the periodic chart of the elements refer to the groups of elements, arranged as vertical columns of related elements, as shown, for example, in the periodic chart of the elements on pages 448 and 449 of the Handbook of Chemistry and Physics, 41st edition, published by the Chemical Rubber Publishing Company, Cleveland, Ohio.

In the past, relatively few methods have been suitable for preparing semiconductive coatings, and, of those which are known and which have been generally utilized, few, if any, may be controlled to the extent that semiconductive layers of predetermined quality and characteristics can systematically be prepared or reproduced with such methods. The conventional processes now in use for making semiconductive films, particularly photoconductive films, essentially fall into one of the following types of processes or are minor variations thereof:

(I) An evaporation process, in which the material to be coated on a substrate is placed in a container and heated sufficiently to vaporize the material while the container and the substrate are under vacuum. Under these conditions, the vapors condense on the substrate and form a layer of the desired coating material. The film thickness and other variables may be controlled to some extent by varying the temperature, the vacuum, the time of operation, etc. A process of this type, for example, is shown in United States Patents No. 2,688,564, issued to Stanley V. Forgue on September 7, 1954, and No. 2,844,493, issued to Herbert Schlosser on July 22, 1958;

(II) A process based on chemical deposition, such as those exemplified in United States Patents No. 2,809,134, issued to Oran T. McIlvaine on October 8, 1957, and No. 2,917,413, issued to Gustaf W. Hammar and Frank C. Bennett on December 15, 1959, in which a semiconductive coating is prepared by applying a solution of desired semiconductive elements to a substrate and precipitating and drying said elements on the substrate. For some purposes, the so-formed coating is heated to modify the semiconductive properties of the coating; and (III) A vapor reaction process, wherein coating elements are vaporized separately and allowed to react at the surface of a substrate to be coated, the substrate being held under a vacuum, and thus provide crystals of the desired compound on said substrate surface. A process of this general type is described in "Physical Review," 106, 703 (1957), in an article by R. H. Bube.

Other methods for forming semiconductive layers have also been described, such as the sintering method disclosed in United States Patent No. 2,879,362, issued to Ralph L. Meyer on March 24, 1959; however, these methods, as well as the previously-described methods, are all subject to one or more of the following principal disadvantages:

With reference to process (I), evaporation process, (a) need for a vacuum chamber or enclosure; (b) controlled incorporation of impurities is difficult; (c) films usually have little or no crystallinity; (d) film thickness is usually limited; (e) necessity of approximately matching the coefficient of expansions of the desired film and of the substrate.

With reference to process (II), chemical deposition, (a) limited to films such as PbS and PbSe, which can be made by precipitation from solution; (b) bath depletion renders the process discontinuous; (c) film thickness is limited; (d) process is wasteful in that a large proportion of the film-forming material deposits on the walls of the deposition vessel.

With reference to process (III), vapor reaction process, (a) a vacuum system is required; (b) the individual elements must be handled and heated separately; (c) each element vaporizes at a different temperature; (d) the vapor pressure of each element must be high enough so that the elements can react; (e) a major amount of the elemental charge is lost by coating the inside of the vacuum enclosure in addition to coating the substrate; (f) precise control of the vaporization and the reaction is necessary, extremely difficult to manage, and expensive.

It is manifest, therefore, that such known processes are subject to a number of inherent disadvantages. In general, such prior-art processes require expensive vacuum equipment, are uneconomical and wasteful, require extreme care in operation, have limited application, and usually provide semiconductive films with widely-variable optical and electrical characteristics. Because of the near impossibility of obtaining uniform and reproducible photoconductive semiconductor characteristics with the processes now utilized by industry, it is common and necessary to employ one hundred percent inspection procedures in order to select, grade, and segregate those films which meet minimum specification requirements.

In contrast to the disadvantages inherent in such known processes, the process of this invention provides inorganic films, particularly photoconductive semiconductor films, having uniform and reproducible physical and electrical characteristics. Films produced in accordance with this process, as will be pointed out in detail hereinafter, have a high degree of uniformity within a given batch with respect to such characteristics as optical transmittance and thickness of film, crystal size, distribution of crystal sizes, light and dark resistance, sensitivity to radiant energy, response time, spectral response, etc. In addition to the high degree of uniformity easily obtainable by the process of the invention, it provides means for obtaining an equally high degree of reproducibility of such characteristics when the process is utilized with similar but separate batches of soluble elements capable of forming semiconductive films.

A partial list of advantages associated with the instant novel process is set forth below. The list will serve to indicate some of the areas in which the novel process differs from the prior-art processes as well as to point out some specific improvements and simplifications over such known processes. The novel process (1) within the same batch, provides films having optical and electrical uniformity; (2) provides reproducibility of characteristics from batch to batch; (3) conserves materials; (4) deposits a crystalline film; (5) deposits stoichiometric compound; (6) requires no vacuum apparatus or enclosure; (7) provides simple deposition of multiple-layer films; (8) provides easy deposition of multiple-element films such as ZnCdS and $CdIn_2Se_4$; (9) provides easy control of film thickness; (10) provides films with good adherence to such materials as glass, mica, ceramics, quartz, etc.; (11) provides easy method for incorporating impurities in a film; (12) requires no special cleaning of substrate; i.e., acid, gas discharge, or electron bombardment; (13) readily forms films of high temperature material such as samarium sulfide with a melting point of about 1,900 degrees centigrade; and (14) utilizes a spray solution which contains all of the elements necessary for forming the desired film; none of the film-forming elements are obtained from the surrounding atmosphere or from the substrate.

It is one object of the invention to provide an economical, versatile, and simple process for making semiconductive films, which process is not subject to the many disadvantages and limitations of such methods as the evaporation, vapor reaction, and sintering methods, etc., which are known to industry at the present time.

It is the principal object of the the invention to provide an improved process for making thin inorganic semiconductive films, particularly photoconductive films, the process comprising spraying, under ambient atmospheric conditions, a solution of elements onto a heated substrate, the solution containing soluble salts is one or more elements from group VIA and soluble salts of one or more elements selected from one or more of the elements of groups IB, IIB, IIIA, IIIB, IVA, VA, and VIII of the periodic chart of the elements.

Another object of the invention is to provide a process with which photoconductive films having uniform and reproducible characteristics are readily and economically prepared with a minimum of controls and equipment.

Still another object of the invention is to provide a photoconductive film on a glass or related material substrate by spraying a solution containing soluble compounds of selected inorganic elements onto the heated substrate, the film having excxellent adherence to the substrate and ranging in spectral absorption and thickness to present an appearance varying from clear and transparent to diffusely reflecting and opaque.

Yet another object of the invention is to provide a process for manufacturing photoconductive films, which process is at the same time simple to operate and easily controlled, which readily permits control of percentage composition of films (a serious problem in the evaporation and vapor reaction processes), and which also provides a most direct and efficient means for controlled addition of impurities and yet requires no complex and expensive vacuum or delicate control equipment.

Another object of the invention is the provision of a process uniquely adapted for manufacturing multi-layer and multi-element semiconductors.

Yet another object of the invention is to provide a thin photoconductive film and the process for making said film, wherein the decay time of said film is decreased by a factor of ten when compared to similar photoconductors prepared by known commercial processes.

Another object of the invention is to provide a process well adapted for depositing uniform and reproducible photoconductive semiconductor films on large or minute surface areas with equal facility and efficiency.

Still another object of the invention is to provide a novel process for manufacturing photoconductive films, the films prepared by the process being characterized by the correspondence of their spectral response and optical absorption curves over a wide spectral range, including the visual portion of the spectrum; the characteristics of these films contrasting with those of commercially available photoconductors prepared by known processes in that the spectral response of the latter normally falls off sharply at wavelengths shorter than the absorption edge.

The novel features of the invention are set forth with particularity in the appended claims. Further advantages and objects of this invention, together with the manner of operation thereof, may best be understood by reference to the following description taken together with the following drawings, where:

Figure 1:
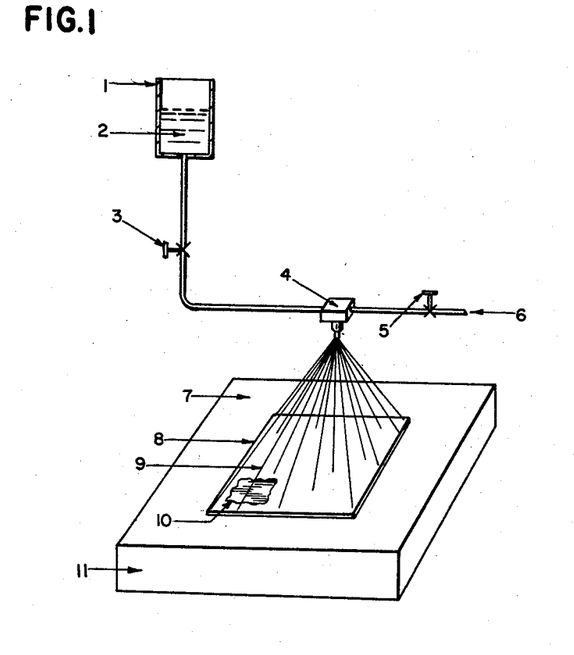
FIG. 1 is a diagrammatic representation of the spraying apparatus and of the heating means associated with the invention.

Referring now to FIG. 1, there is shown a diagrammatic illustration of an apparatus for carrying out the process of this invention. A solution 2, containing in dissolved form the elements which will form the photoconductive film coating 10, is placed in a container 1 and fed to a nebulizer head 4 through a tube connecting the two, the rate of solution flow being controlled by a valve 3. Upon entering the nebulizer, the solution 2 is atomized through an orifice in the nebulizer head with the aid of a stream of gas, the pressure of which is regulated by a valve 5. The substrate 8 to be coated is placed on a hot plate 11 and heated to the desired temperature by heat conduction from a heated surface 7. After the substrate 8 has reached the desired temperature, a highly-atomized spray 9 is directed over the surface to form the inorganic film 10. The film is formed as an adherent film on the surface of the heated substrate 8 by a chemical reaction between the soluble salts of the film-forming inorganic elements, the reaction being induced by the heat gradient which is maintained on said surface. Films formed under the conditions described above are derived wholly from elements which were originally present in the sprayed solution. None of the elements constituting the photoresponsive film are derived either from the substrate or from the surrounding atmosphere in the process of the invention. The heat energy supplied to the hot plate may be obtained from any conventional means, as from a flame or from an electrical source. The rate of flow of the solution is not critical and may be varied from .01 to 1 gallon per hour; however, the rate normally employed is about 0.1 gallon per hour. It has been found that varying the rate of flow of solution has an effect on crystal size of the deposited film. The lower the rate, the smaller the crystals tend to be; and the smaller the crystals, the more transparent and clear the film tends to be.

The type of gas or the pressure at which it is fed to the nebulizer is also not critical in the process. Generally, air is supplied at about ten to twenty pounds to the square inch, but nitrogen, argon, etc., may be utilized within the same pressure range or at or about the stated pressures, depending on the rate of spray and on the coating thickness desired.

The following example describes in detail the preferred solution composition and the preferred operation and control of the process for manufacturing a cadmium selenide photoconductive film on a glass substrate.

EXAMPLE I

An aqueous solution is prepared by mixing 500 mls. of .02 molar cadmium acetate and 500 mls. of a .02 molar solution of N,N-dimethylselenourea. The solution so prepared is placed in the container 1 (FIG. 1) and fed to the nebulizer 4 under slight positive pressure. A stream of filtered air is simultaneously fed to the nebulizer through the valve 5 under a positive pressure of about twenty pounds to the square inch. The air stream contacts the solution stream within the nebulizer, and the solution is thus ejected as a fine spray or atomized spray through a jet or nozzle attached to the nebulizer at a flow rate of about 0.1 gallon per hour. The total 1,000 mls. placed in the container is thus atomized, and the spray is directed onto a flat smooth piece of glass 8, measuring approximately 1 by 2 by .06 inches, which is continuously and evenly heated to and maintained at a temperature of about 536 degrees Fahrenheit by heat conduction from the heated surface 7. The cadmium selenide film formed on the glass substrate by the above-described procedure is extremely smooth and has excellent adherence to the glass base. After the coated substrate is cooled, and after said substrate has been post-heat-treated, suitable electrodes are attached to the film by conventional means, such as by vacuum evaporation, by ultrasonic means, etc., to provide ohmic contacts in order to test and utilize the photoconductive properties of the films.

Indium is generally used for making ohmic contacts with films prepared by the process of the invention. However, ohmic contacts with such metals as aluminum, gold, lead, indium, tin, zinc, and silver have been made with the films of this invention without the necessity of special treatment of the film surface. The electrical and optical characteristics of the cadmium selenide film of this example, as well as the characteristics of other films prepared in the same general manner, will be more fully described hereinafter in connection with the description of FIGS. 2 to 8, inclusive.

Semiconductive films may be made by the process of Example I with a large variety of elements besides the cadmium and selenium which are shown in this example.

A large number of preferred films have been prepared by the above-described process with solutions containing soluble salts of at least one element selected from the group consisting of sulfur and selenium and a soluble salt of at least one of the elements selected from the group consisting of cadmium, copper, silver, zinc, indium, gallium, gadolinium, samarium, lead, arsenic, and cobalt.

The following table illustrates the broad scope of the instant novel process by specifying representative semiconductive films which have been made with elements selected from different groups of the periodic table of the elements.

*Table 1*

| IB VIA | IIB VIA | IIIA VIA | IIIB VIA | IVA VIA | VA VIA | VIII VIA | IIB IIIA VIA | IIB IIB VIA |
|---|---|---|---|---|---|---|---|---|
| $Cu_2S$ $Ag_2S$ | CdS CdSe ZnS ZnSe | $In_2S_3$ $In_2Se_3$ $Ga_2S_3$ $Ga_2Se_3$ | GdSe SmS | PbS PbSe | $As_2S_3$ | CoSe | $CdInSe_2$ | CdZnS |

The process of this invention may be utilized for making photoconductive and semiconductive films consisting of any element or combination of elements which may be converted to a soluble compound, such as a soluble salt organic compound, or a soluble metallo-organic compound.

In general, suitable soluble compounds of elements from group VIA have been organic or metallo-organic compounds illustrated by the following:

(1) N,N-dimethylselenourea
(2) N,N-diethylselenourea
(3) N,N-diisopropylselenourea
(4) Selenourea
(5) Thiourea
(6) Allythiourea
(7) Thioacetamide
(8) Thiosemicarbazide
(9) Thiolacetic acid Soluble salts of elements from previously-mentioned groups other than group VIA may be acetates, halogen derivatives, and nitrates, for example, or the salt may include other solublizing anions such as sulfates and perchlorates and for some elements complex anions such as cadmium cyanide and cupric ammonia ions. It can be seen that any of the elements selected from the groups mentioned above may be used in the process of the invention, so long as soluble compounds of said elements are made available.

It should be understood that it is also within the purview of the invention to make up the spray solution with the complex salt $Cd(CN_2H_4S)_2Cl_2$, cadmium chloride-thiourea complex, as the only source or as one of the sources of film-forming elements, instead of forming the spray solution with two or more compounds, each of which compounds contains at least one of the thin-film-forming elements.

In general, the concentration of the salts dissolved in the solution to be sprayed is adjusted to be between .01 and .02 molar; however, considerable variation is permissible, depending on the film thickness desired and on the rate of deposition, etc. Greater or lesser concentrations than the above range are adequate in many instances. Concentrations as low as .001 molar and as high as .01 molar have given satisfactory results. Generally, 1,000 mls. of .01 M solution is sprayed to cover fifty square inches of substrate, although the amount may vary with the desired characteristics.

It should be understood that, although the temperature at which the substrate must be maintained during the spraying and coating operation is not critical, there exists a minimum temperature below which the necessary film-forming reaction will not take place. The following table, composition of solutions used in the preparation of each listing the type of photoconductive films as well as the film, illustrates representative minimum substrate temperatures required in the process of the invention:

Table II

| Type of film | Composition of spraying solution | | Minimum substrate temperature during spraying (degrees Fahrenheit) |
|---|---|---|---|
| Ags | .01 M AgNO$_3$<br>.01 M N$_2$H$_4$CS | in 10:1 H$_2$O-HNO$_3$ | 350. |
| Pbs | .01 M Pb(oAc)$_2$<br>.01 M N$_2$H$_4$CS | in H$_2$O | 180. |
| Cds | .01 M CdCl$_2$<br>.01 M N$_2$H$_4$CS | in H$_2$O | 370. |
| Zns | .01 M ZnCl$_2$<br>.01 M N$_2$H$_4$CS | in H$_2$O | 380. |
| Hgs | .01 M HgCl$_2$<br>.01 M N$_2$H$_4$CS | in H$_2$O | 360. |
| Cus | .01 M CuCl$_2$<br>.01 M N$_2$H$_4$CS | in H$_2$O | 360. |
| Sb$_2$S$_3$ | .01 M SbCl$_3$<br>.01 M N$_2$H$_4$CS | in H$_2$O | {290 yellow.<br>{300 black. |
| As$_2$S$_3$ | .01 M As$_2$O$_3$<br>.01 M N$_2$H$_4$CS | in 12 M HCl | 280. |
| Ga$_2$S$_3$ | .01 M Ga(o Ac)$_3$<br>.01 M N$_2$H$_4$CS | in H$_2$O | {270 black.<br>{400 yellow. |
| In$_2$Se$_3$ | .01 M In(NO$_3$)$_3$<br>.01 M (CH$_3$)$_2$NCSeNH$_2$ | in H$_2$O | 170. |
| CoSe$_2$ | .01 M CoCl$_2$<br>.01 M (CH$_3$)$_2$NCSeNH$_2$ | in H$_2$O | 280. |
| CdSe | .01 M Cd(oAc)$_2$<br>.01 M (CH$_3$)$_2$NCSeNH$_2$ | in H$_2$O | 220. |

The extent of variation shown in the above table with respect to minimum substrate temperature associated with several types of semiconductive films should indicate to one acquainted with the art the range of such temperatures which might be required by films having different elemental compositions.

It should be noted that, although the maintenance of minimum substrate temperatures during the spraying operation is necessary to provide for the proper crystal structure and thus also provide photoconductor characteristics in the deposited film, maintaining such temperatures never becomes a problem in practice, since the actual temperature of the substrate is normally maintained above the minimum temperature. However, the thermal conductivity of the substrate largely determines the upper temperature limit at which the film being deposited begins to sublime. In Example I, for instance, a glass substrate is maintained as stated, at 536 degrees Fahrenheit, whereas a substrate of the much more highly heat-conductive Al$_2$O$_3$ would be heated only to 250 degrees Fahrenheit. For most films within the purview of this invention, the substrate temperature may be maintained between about 200 degrees Fahrenheit and about 700 degrees Fahrenheit during the coating operation.

It should also be noted that, inasmuch as substrates coated in accordance with the invention are subjected to rather high temperatures, and also for the reason that it is often advantageous to subject coated substrates to post-heat-treatment up to temperatures between 900 degrees Fahrenheit and 1,200 degrees Fahrenheit, such substrates must necessarily be composed of heat-resistant material; i.e., material that can withstand at least post-heat-treatment temperatures without decomposition or noticeable deformation. As previously mentioned, many types of glass, quartz, ceramic such as Al$_2$O$_3$, and related compositions meet these requirements and form excellent substrates for films made according to this invention. In addition to the above characteristics, the substrate must be a good insulator, since the application and use of substrates coated with a photoconductive film necessitates that the electrical resistance of the substrate be at least as high as, and preferably higher than, the dark resistance of the photoconductive film deposited thereon. Hence, the base or substrate resistance should be greater than about $10^{12}$ ohms per square, since the dark resistance of photoconductive films of this invention generally is in the range $10^{11}$ to $10^{12}$ ohms per square.

As hereinbefore mentioned, the advantages and inherent optical and electrical characteristics of photoconductive semiconductor films prepared by the novel process of the invention will be described in connection with FIGS. 2 to 8 inclusive.

Figure 2:
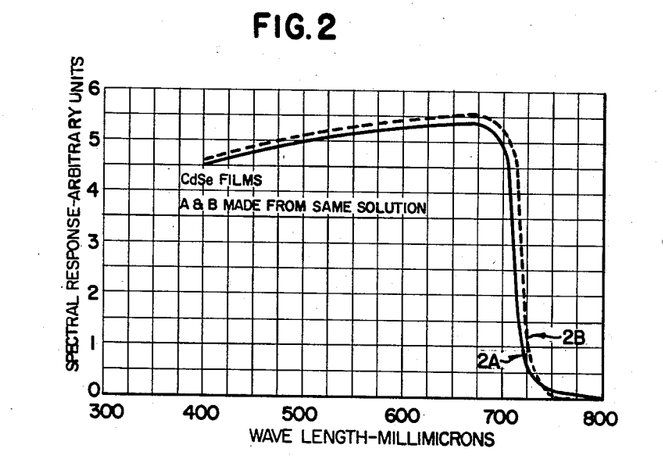
FIGS. 2 to 8, inclusive, are graphs depicting selected optical and electrical characteristics of semiconductive films prepared by the instant novel process.

FIG. 2 illustrates the uniformity and reproducibility of spectral response, curves 2A and 2B, obtained with two CdSe photoconductive films prepared from the same spraying solution batch. The films were coated as in Example I and then subjected to the same post-heat-treatment at 1,100 degrees Fahrenheit for thirty minutes in a nitrogen atmosphere. In this figure, curves 2A and 2B clearly show a maximum spectral response at the same wavelength; i.e., at about 680 millimicrons. Curves 2A and 2B further illustrate a unique characteristic and advantage of the spectral response obtained with films of this invention when compared with the spectral response obtained with prior-art photoresponsive single crystals, films, and powders. It should be noted that the spectral response decreases only slightly from its maximum as the wavelength is decreased, contrary to the sharp spectral response peaks and rapid decrease of spectral response to zero at shorter wavelengths which are generally observed with prior-art photoconductors. Selected photoconductive films of this invention are thus sensitive to the full visual spectrum, a characteristic of great value and utility in consideration of applications of such films in the field of photography. Typical of such applications include, for example, use of these films as photoconductive elements in light meters and as photosensitive diaphragm or iris exposure controls in so-called automatic cameras.

Figure 3:
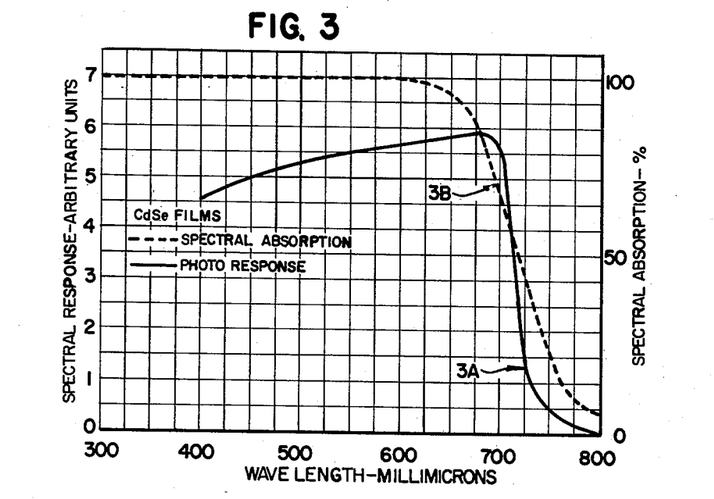

Referring to FIG. 3, curves 3A and 3B illustrate the correspondence between spectral absorption curve 3B and spectral photoresponse curve 3A. As alluded to in connection with FIG. 2, it is known that the spectral photoresponse of prior-art photoconductors usually falls off sharply at wavelengths shorter than the absorption edge, and that the rate of decrease in photoresponse usually increases with photosensitivity. Contrary to the results obtained with such prior-art materials, spectral photoresponse curves of films prepared in accordance with this invention closely correspond to the spectral absorption curves of such films and yet surprisingly exhibit high photosensitivity. It should be noted, for example, that, even though the incident radiation is completely absorbed at a wavelength of 400 millimicrons (curve 3B), the spectral photoresponse at this wavelength is still over 80% of the maximum which occurs at a wavelength of about 680 millimicrons (curve 3A). Curves 3A and 3B were prepared with films made as in Example I and post-heat-treated as explained in connection with FIG. 2. Furthermore, curves 3A and 3B were obtained with films prepared in exactly the same manner in which the films used for preparing curves 2A and 2B were prepared, except for the use of a new batch of solution. It can be seen by comparing curves 2A and 2B of FIG. 2 with curve 3A of FIG. 3 that the reproducibility of spectral response from batch to batch is excellent.

Of the many advantages and unexpected characteristics inherent in the photoconductive films and process of the invention, the most unexpected, and the most appealing from a commercial standpoint, are the ease and fidelity with which uniform and reproducible photoconductor characteristics are obtained with the economical and simple process described herein. Some of the characteristics which may be examined as a measure of film uniformity and reproducibility are, for example, spectral photo response and spectral absorption, light and dark resistance, rise time and decay time, film thickness, etc.

The following indicates and serves to illustrate the high degree of uniformity and reproducibility with respect to light and dark resistance of the films of this invention.

Twenty-five individual cells were made by coating glass substrates with CdSe by spraying a portion of three separate batches of spray solution by the method of Example I, and post-heat-treatment at 1,100 degrees Fahrenheit for thirty minutes in a nitrogen atmosphere. After suitable electrodes (ultrasonically applied indium) had been placed on the films, light and dark resistance measurements were taken on each cell with conventional equipment by known methods.

*Table III*

Average light resistance obtained with 25 individual CdSe cells ____________________ $1.63 \times 10^4$
Average dark resistance obtained with 25 individual CdSe cells ____________________ $6.20 \times 10^{11}$
Percent variation from average light resistance ____________________ $\pm 29$
Percent variation from average dark resistance ____________________ $\pm 50$ It should be noted that the above percent variations are of a very low order when it is considered that variations in resistance, as well as in other parameters, of photoconductors produced by known commercial processes are known to be of the order of at least 200% to 400%.

As heretofore mentioned, the extremely fast decay time exhibited by films of this invention is still another unexpected characteristic which may be easily reproduced by the process of the invention.

By way of illustration, the following table discloses the rise time and decay time, in milliseconds, obtained with CdSe films of this invention, compared with the values obtained with commercially-available high-quality CdSe photoconductors. The photoconductors were all exposed to a neon (type Ne2) source of light operated at a current of 2 milliamperes, and the photoconductors were maintained at a potential difference of 45 volts.

*Table IV*

| Sample | Rise time to 90%, milliseconds | Decay time to 10%, milliseconds |
| --- | --- | --- |
| Commercial A | 4.0 | 5.00 |
| Commercial B | 3.2 | 3.50 |
| A1 | 1.5 | 0.25 |
| B7 | 3.0 | 0.40 |
| A7 | 2.2 | 0.30 |
| A9 | 2.0 | 0.40 |
| X5 | 1.9 | 0.28 |
| X6 | 2.4 | 0.26 |
| X9 | 2.5 | 0.32 |

It can be seen from this table that, although the rise times to ninety percent of equilibrium value for the commercial samples compare well with the rise times of the films of the invention, the decay time to ten percent of the latter are at least ten times less than the decay time of the former. This advantage is of great importance for any use which includes a cycling operation; for example, a high-speed counting operation wherein a light beam directed onto a photoconductive film is interrupted by a series of closely-spaced opaque objects. It is thus obvious that, the shorter the decay time, the greater the number of counts per minute which can be made for any particular photo-responsive film and apparatus arrangement.

Figure 4:
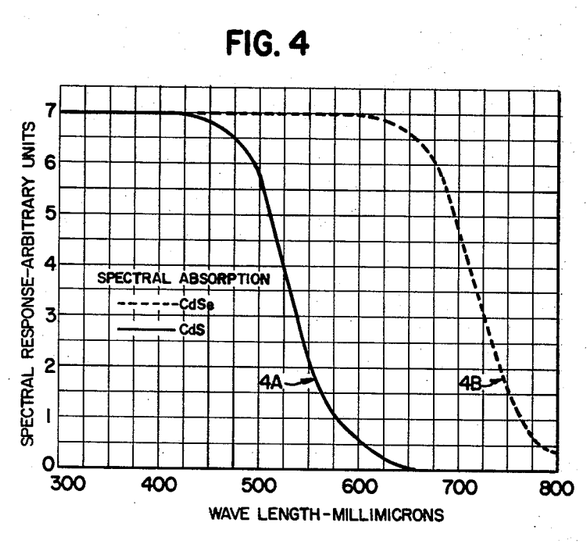

FIG. 4 shows the spectral absorption of a cadmium sulfide film, curve 4A, and of a cadmium selenide film, curve 4B. Both films were prepared in the manner of Example I. Curve 4A indicates that the spectral absorption of CdS films increases sharply from zero absorption at about 650 millimicrons to 100% absorption at about 425 millimicrons; whereas curve 4B shows an absorption for a CdSe film of near zero at 800 millimicrons and 100% absorption at about 600 millimicrons.

Figure 5:
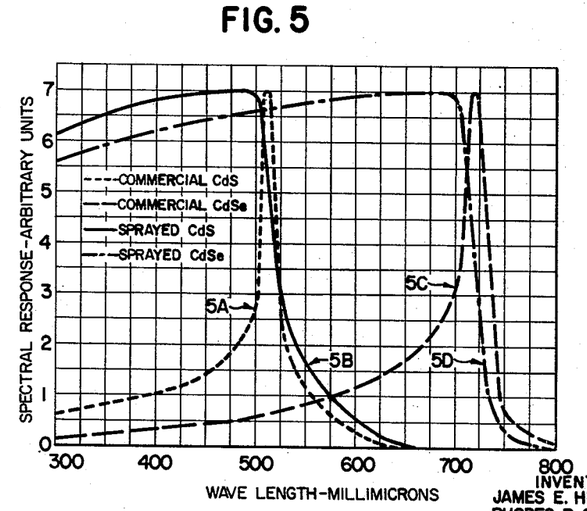

FIG. 5 illustrates the comparison between the spectral photoresponse of CdS and CdSe films of this invention with commercial CdS and CdSe photoconductive films. Curves 5A and 5C show the typical strongly-peaked photoresponse common to most commercially-available photoconductors. In sharp contrast, curves 5B and 5D show the typical flat spectral photoresponse curves invariably obtained with photoresponsive films of this invention. Curves 5B and 5D, as with curves 2A and 2B of FIG. 2, vividly illustrate the slight decrease in spectral photoresponse from maximum with decrease in the wavelength of incident light. This, of course, indicates that these films are nearly as sensitive to extremely short wavelength radiation, as in the ultra-violet region, as they are at the wavelength of maximum response. On the other hand, commercially-available photoconductors, such as those represented by curves 5A and 5C, are photoresponsive only over a very narrow wavelength region.

Figure 6:
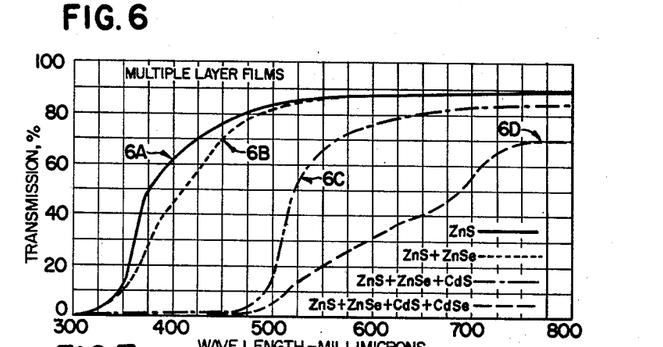

Referring now to FIG. 6, there is shown a series of curves illustrating the variation in spectral transmission obtained with a substrate coated with multiple layers of different semiconductive compounds, each layer being separately coated by spraying a solution of the desired compounds according to the instant process.

In the preparation of the layers of curves 6A, 6B, 6C, and 6D, the general procedure disclosed in Example I is followed, except that multiple layers are successively deposited by sparying the desired solution first onto a transparent heated substrate, then onto the previously deposited layer. For example, the film corresponding to 6A is prepared by spraying a glass slide, maintained at about 600 degrees Fahrenheit, with 1,000 mls. of an aqueous solution containing .01 M $ZnCl_2$ and .01 M thiourea; the film corresponding to 6B by spraying 1,000 mls. of an aqueous solution containing .01 M $ZnCl_2$ and .01 M N,N-dimethylselenourea onto the first deposited ZnS layer, which in conjunction with the substrate is also maintained at 600 degrees Fahrenheit during this second spraying operation. The subsequent layers corresponding to curves 6C and 6D are deposited in a similar manner in accordance with the foregoing disclosure.

It can be seen from the plot of the curves that different combinations of photoconductive layers absorb different wavelengths of light. For example, curve 6C indicates that multiple layers of ZnS, ZnSe, and CdS absorb practically all light with a wavelength shorter than 500 millimicrons. Thus, it is possible to make light filters having desired absorption characteristics by the deposition of mutliple layers on suitable substrates by the practice of the efficient and uncomplicated process of the invention.

Figure 7:
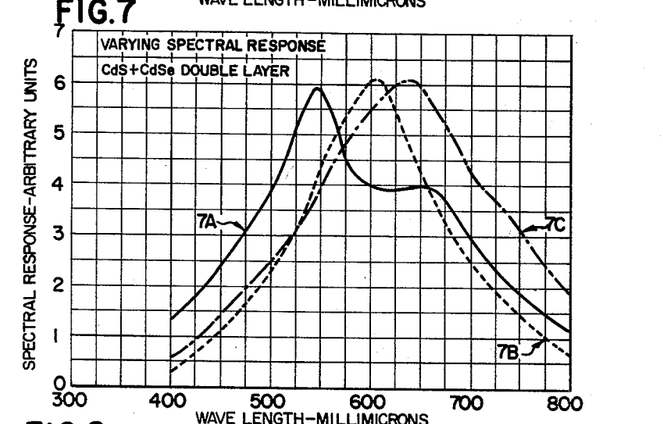

FIG. 7 illustrates the flexible and facile manner by which desired photoresponse characteristics can be incorporated in the photoconductor films of this invention. Spectral photoresponse curves 7A, 7B, and 7C were obtained by controlled heat treatment of a double layer consisting of a film of CdS deposited on a film of CdSe, the two films being coated on a substrate as follows:

EXAMPLE II

Three glass substrates (1 inch x 3 inches x .06 inch) are heated to and maintained at a temperature of 550 degrees Fahrenheit. The film of curve 7A is made by first spraying (in the manner of Example I) 500 mls. of .01 M CdSe film-forming solution and then following by spraying 100 mls. of .01 M CdS film-forming solution, the soluble salts of which solutions are disclosed above, onto one of the heated glass substrates. Similarly, the films of curves 7B and 7C are made by spraying, respectively, 500 mls. of .01 M CdSe and 250 mls. of .01 M CdS; and 500 mls. of .01 M CdSe and 500 mls. of .01 M CdS film-forming solutions onto the other two heated glass substrates. All three coated films are then heat-treated at 900 degrees Fahrenheit for fifteen minutes. This treatment causes the elements in each film to diffuse into the other, conjoint, film. It should be noted that the heat-treatment is the same for all three films; the difference in spectral response between curve 7A, with a peak response at 550 millimicrons, and curve 7C, with a peak response at 640 millimicrons, is thus seen to vary with the relative quantities of photoresponsive compounds constituting the films which are layered over each other. That is, in the double layer of curve 7A, the ratio of CdSe to CdS, based on the volume of the sprayed solution, is 5:1, respectively; for curve 7B, the ratio is 2:1; and for curve 7C, the ratio is 1:1.

Alternatively, the same effect may be obtained by subjecting similar double-layer films, wherein the double layer is composed of equal quantities of each photoresponsive compound, to the same heat-treating temperature (900 degrees Fahrenheit) but for different time intervals. The following example illustrates this procedure.

EXAMPLE III

Three glass substrates are heated to and maintained at a temperature of 550 degrees Fahrenheit, and then, in the manner shown in Example I, are sprayed at that temperature with 500 mls. of .01 M CdS film-forming solution and subsequently with 500 mls. of .01 M CdSe film-forming solution, thus forming glass substrates coated with successive films of CdS and CdSe. Curve 7A is obtained with one such film which has been post-heat-treated at 900 degrees Fahrenheit for ten minutes, curve 7B with a film post-heat-treated at 900 degrees Fahrenheit for twenty minutes, and curve 7C with another film post-heat-treated at 900 degrees Fahrenheit for forty minutes.

Figure 8:
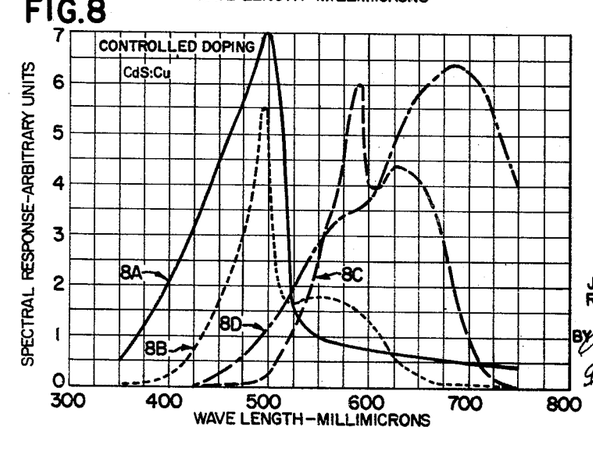

Referring to FIG. 8, curves 8A, 8B, 8C, and 8D illustrate the effect on spectral photoresponse of controlled doping in a photoconductive film. Controlled "doping," as it is commonly called, consists of adding either donor or acceptor impurities, or both, into a semiconductor material. Donor impurities are elements found in groups of the periodic chart of the elements to the right, usually the immediate right, of the elements constituting the conductive film; i.e., elements in groups III and VII of the periodic chart act as donor elements when incorporated into any II–VI photoconductive semiconductor film, such as CdSe, ZnTe, etc. On the other hand, acceptor impurities are elements found in periodic groups to the left of the elements constituting the conductive materials. The effects to be expected by incorporating elemental impurities in semiconductors and photoconductors is known for certain combinations of elements; however, in the majority of combinations the art is not so advanced that the effects may be predicted with certainty.

In general, it is recognized that one or more of the following effects will follow the addition of impurities in a photoconductor: (1) the speed of response may be changed, (2) the range of spectral response may be extended, (3) the conductivity may be changed, and (4) the photosensitivity may be changed. Also, it may generally be said that donor impurities, if added to n-type materials, increase, but, if added to p-type material, decrease, conductivity; contrariwise, acceptor imperfections added to p-type material increase, and acceptor imperfections added to n-type material decrease, the conductivity.

The disclosure relating to FIG. 8 is included herein to illustrate the versatility, the suitability, and the relative ease with which controlled doping of photoresponsive films may be practiced with the novel process of the invention compared to the difficult, expensive, and technical diffusion methods currently being used by industry. The use of diffusion methods for doping conductive materials, whether solid state or vapor phase diffusion is employed, are well known in the art to be difficult to control, to require expensive and delicate equipment, and to generally provide inconsistent results. All of these prior-art disadvantages are essentially overcome by the practice of this invention.

FIG. 8 clearly shows the shift in peak spectral response toward higher wavelength of several CdS photoconductor films containing increasing amounts of Cu acceptor impurity. Generally, Cu and Ag impurities have the greatest effect on shifting the peak spectral response. Other elements such as Mn, Co, Ni, and Zn may be added to films as impurities to produce different effects. The films corresponding to curves 8A, 8B, 8C, and 8D were prepared as follows:

EXAMPLE IV

Four separate glass slides were coated by the process of Example I with 400 mls. of solution made up as follows:

Four 400-ml. aqueous solutions, each containing .01 M $CdCl_2$ and .01 M thiourea, were made up.

To provide the films of curve 8A, 400 mls. of this solution was sprayed without modification onto a glass substrate maintained at about 535 degrees Fahrenheit.

To provide the film related to curve 8B, 10 mls. of .0001 M $Cu^{++}$ was added to the cadmium-containing solution prior to spraying. Similarly, 10 mls. of .001 M $Cu^{++}$ and 10 mls. of .01 M $Cu^{++}$ were added to solutions corresponding to the films of curves 8C and 8D, respectively. All four of the films formed by spraying the above-described solutions were then heat-treated at 1,000 degrees Fahrenheit for fifteen minutes.

The same general procedure disclosed in connection with FIG. 8 and Example IV is well suited for providing photoluminescent coatings such as, for example, cathodoluminescent screens. The process of this invention is particularly advantageous in this connection, inasmuch as it may be applied for coating large areas such as television and cathode screens and the like without difficulty or additional equipment.

EXAMPLE V

Films containing one or more donor and acceptor impurities, such as a ZnCdS:Ag, Cl film, for example, may be readily prepared by the process of this invention.

An orange photoluminescent screen having a transparent glass base was prepared with the following solution in the manner generally described in the process of Examples I and IV:

20 mls. of aqueous 1 M $Zn^{++}$ solution.
13.3 mls. of aqueous 1 M $Cd^{++}$ solution.
2 mls. of aqueous .01 M $Ag^{++}$ solution.
66 mls. of aqueous 1 M thiourea solution.
$H_2O$ to make 500 mls. of solution.

This solution is sprayed at the rate of 200 mls. per hour onto a glass substrate kept at 400 to 450 degrees Fahrenheit. If desired, the so-coated substrate is post-heat-treated at a temperature below the distortion point of the substrate, to enhance the brightness and adherence of the film to the substrate, and to promote homogeneous distribution of the impurities within the body of the Zn:CdS crystal lattice.

While the invention has been described with respect to certain embodiments of the novel process and with respect to certain characteristics and uses of preferred semiconductive elements provided by said process, it should be understood that various changes in the details of operation and in the disclosed compositions may be made by those skilled in the art without departing from the scope and spirit of the invention.

What is claimed is:
1. A process for making an inorganic compound thin film, the conductivity of said film being within a range normally found in photoconductive and luminescent films, comprising the steps of (1) uniformly heating a heat-resistant substrate to a temperature ranging from about 200 degrees Fahrenheit to about 700 degrees Fahrenheit, and (2) spraying onto said substrate, under ambient atmospheric conditions, a solution containing a soluble compound of at least one of the elements from group

VIA of the periodic chart of the elements and a soluble compound of at least one element selected from the elements of groups IA, IIB, IIIA, IIIB, IVA, VA and VIII of the periodic chart of the elements, the elements forming said film being derived exclusively from elements originally present in said sprayed solution.

2. The process of claim 1 wherein the pressure vehicle for said spraying is provided by a stream of air.

3. A process for making an inorganic compound thin film, the conductivity of said film being within a range normally found in photoconductors and luminescent films, comprising the steps of (1) uniformly heating a heat-resistant substrate to a temperature ranging from about 200 degrees Fahrenheit to about 700 degrees Fahrenheit, (2) spraying onto said substrate a solution containing a soluble compound of at least one element selected from the class consisting of inorganic elements from the group VIA of the periodic chart of the elements and a soluble compound of at least one element selected from the class consisting of elements of groups IA, IIB, IIIA, IIIB, IVA, VA, and VIII of the periodic chart of the elements, the elements forming said film being derived exclusively from elements originally present in said sprayed solution, and (3) post-heat-treating the film so deposited on said substrate to a temperature between about 900 degree Fahrenheit and 1,200 degrees Fahrenheit in an atmosphere free of oxygen.

4. The process of claim 3 wherein the pressure vehicle for said spraying is provided by a stream of inert gas.

5. A process for providing a photoconductive semiconductor film having increased speed of response when exposed to electromagnetic radiation, and characterized by a spectral photoresponse curve which corresponds to its spectral absorption curve over a spectral range including at least the visible spectrum, and further characterized by having a greatly decreased decay time, said process comprising the steps of (1) uniformly heating a heat-resistant glass substrate to a temperature of 550 degrees Fahrenheit, (2) spraying onto said substrate an aqueous solution containing cadmium acetate and thiourea, both being present in a concentration, individually adjustable, ranging from .001 to .1 molar, the temperature of the substrate being maintained substantially at 550 degrees Fahrenheit through the spraying operation, the elements forming said film being derived exclusively from elements originally present in said sprayed solution, and (3) post-heat-treating the film so deposited on said substrate to a temperature between about 900 degrees Fahrenheit and 1,200 degrees Fahrenheit for about thirty minutes in an atmosphere free of oxygen.

6. A process for making a multiple-layer semiconductive film including a photovoltaic structure, comprising the steps of (1) uniformly heating a heat-resistant substrate to a temperature ranging from about 200 degrees Fahrenheit to about 700 degrees Fahrenheit, (2) spraying onto said substrate a first solution, containing a soluble compound of at least one of the elements from group VIA of the periodic chart of the elements and a soluble compound of at least one element selected from the elements of groups IA, IIB, IIIA, IIIB, IVA, VA and VIII of the periodic chart of the elements, (3) spraying onto the film so formed, the film temperature being maintained within said substrate temperature range, successive solutions containing a different combination of soluble compounds of elements selected from said group VIA and said other aforementioned groups of the periodic chart of the elements, the elements constituting the structure of each layer being derived exclusively from elements originally present in said sprayed solution, and (4) post-heat-treating the film so deposited on said substrate to a temperature between about 900 degrees Fahrenheit and 1,200 degrees Fahrenheit for about thirty minutes in an atmosphere free of oxygen.

7. A process for making a double-layer photoconductive film, comprising the steps of (1) uniformly heating a heat-resistant substrate to a temperature ranging from about 200 degrees Fahrenheit to about 700 degrees Fahrenheit, (2) spraying onto said substrate a first solution, containing a soluble compound of at least one of the elements from group VIA of the periodic chart of the elements and a soluble compound of at least one element selected from the elements of groups IA, IIB, IIIA, IIIB, IVA, VA and VIII of the periodic chart of the elements, (3) spraying onto the film so formed, while the film temperature is maintained within said substrate temperature range, a second solution, containing a different combination of soluble compounds of elements selected from said group VIA and said other aforementioned groups of the periodic chart of the elements, the volume ratio of said first and second solutions varying from 1:1 to 5:1, and the concentration of said soluble compounds in said first and second solutions being individually adjustable and variable from .001 to .1 molar, the elements constituting the structure of each layer being derived exclusively from elements original present in said sprayed solution, and (4) post-heat-treating the double layer so deposited on said substrate to a temperature between about 900 degrees Fahrenheit and about 1,200 degrees Fahrenheit from about ten minutes to about forty minutes in an atmosphere free of oxygen.

8. A process for making a luminescent film, comprising the steps of (1) uniformly heating a heat-resistant substrate to a temperature ranging from about 200 degrees Fahrenheit to about 700 degrees Fahrenheit, (2) spraying onto said substrate a solution containing a soluble compound of at least one of the elements from group VIA of the periodic chart of the elements and a soluble compound of at least one element selected from the elements of groups IA, IIB, IIIA, IIIB, IVA, VA and VIII of the periodic chart of the elements, and as doping impurities, a minor amount of soluble compounds of desired doping impurity elements, the elements forming said film being derived exclusively from elements originally present in the sprayed solution, and (3) post-heat-treating the film so deposited on said substrate to a temperature between about 900 degrees Fahrenheit and 1,200 degrees Fahrenheit for about fifteen minutes in an atmosphere free of oxygen.

9. A process for making a photoconductive film, the elements forming said film being derived exclusively from elements originally present in the sprayed solution, comprising the steps of:
 (1) uniformly heating a heat-resistant substrate to a temperature ranging from 200 degrees Fahrenheit to 700 degrees Fahrenheit,
 (2) spraying onto said substrate a solution containing a stoichiometric amount of a soluble compound of at least one element selected from the group consisting of inorganic elements from group VIA of the periodic chart of the elements and a soluble compound of at least one element selected from the class consisting of the elements of groups IA, IIB, IIIA, IIIB, IVA, VA, and VIII of the periodic chart of the elements, and
 (3) post-heat-treating the film deposited on said substrate to a temperature between about 900 degrees Fahrenheit and about 1,200 degrees Fahrenheit in an atmosphere free of oxygen.

10. A process for providing a photoconductive semiconductor film having increased speed of response when exposed to electromagnetic radiation, and characterized by a spectral photoresponse curve which corresponds to its spectral absorption curve over a spectral range including at least the visible spectrum, and further characterized by having a greatly decreased decay time, said process comprising the steps of (1) uniformly heating a heat-resistant glass substrate to a temperature of 550 degrees Fahrenheit, (2) spraying onto said substrate an aqueous solution containing from .001 to .1 mole per liter of solution of the complex cadmium chloride-thiourea salt of the formula $Cd(CN_2H_4S)_2Cl_2$, the temperature of the substrate being maintained substantially at 550 degrees Fahrenheit through the spraying operation, the elements forming said film being derived exclusively from elements originally present in said sprayed solution, and (3) post-heat-treating the film so deposited on said substrated at a temperature between about 900 degrees Fahrenheit and 1,200 degrees Fahrenheit for about thirty minutes in an atmosphere free of oxygen.

11. A process for providing a photoconductive semiconductive film having increased speed of response when exposed to electromagnetic radiation, and characterized by a spectral photoresponse curve which corresponds to its spectral absorption curve over a spectral range including at least the visible spectrum, and further characterized by having a greatly decreased decay time, said process comprising the steps of (1) uniformly heating a heat-resistant glass substrate to a temperature of 550 degrees Fahrenheit, (2) spraying onto said substrate, an aqueous solution containing cadmium acetate and N,N-dimethyl-selenourea, both being present in a concentration, individually adjustable, ranging from .001 to .1 molar, the temperature of the substrate being maintained substantially at 550 degrees Fahrenheit through the spraying operation, the elements forming said film being derived exclusively from elements originally present in said sprayed solution and (3) post-heat-treating the film so deposited on said substrate to a temperature between about 900 degrees Fahrenheit and 1,200 degrees Fahrenheit for about thirty minutes in an atmosphere free of oxygen.

12. A photoconductive semiconductor film disposed on a heat-resistant support, said film consisting of a polycrystalline mass derived from the reaction of an element selected from group VIA with an element selected from the elements of groups IA, IIB, IIIA, IIIB, IVA, VA, and VIII of the periodic chart of the elements and with mixtures of elements from said groups, said film having a high sensitivity in the visible region of the spectrum, equal to 80% or more of maximum sensitivity at wavelengths shorter than the absorption edge, a shortened decay time to within 10% of the dark resistance of less than .5 millisecond, and a photoresponse curve which parallels and corresponds to its spectral absorption curve.

13. The photoconductive film of claim 12 wherein said film consists of a polycrystalline mass of cadmium sulfide.

14. The photoconductive film of claim 12 wherein said film consists of a polycrystalline mass of cadmium selenide.

References Cited in the file of this patent

UNITED STATES PATENTS

| | | |
|---|---|---|
| 2,659,682 | Anderson | Nov. 17, 1953 |
| 2,997,409 | McLean | Aug. 22, 1961 |
| 3,027,277 | Van der Linden | Mar. 27, 1962 |

UNITED STATES PATENT OFFICE
CERTIFICATE OF CORRECTION

Patent No. 3,148,084                          September 8, 1964

James E. Hill et al.

It is hereby certified that error appears in the above numbered patent requiring correction and that the said Letters Patent should read as corrected below.

Column 1, line 15, for "invenution" read -- invention --; line 33, for "semimconductive" read -- semiconductive --; column 3, line 46, for "diadvantages" read -- disadvantages --; line 54, for "is" read -- of --; line 68, for "excxellent" read -- excellent --; column 6, line 66, for ".01" read -- .1 --; line 75, strike out "composition of solutions used in the preparation of each" and insert instead -- listing the type of photoconductive films as well as the --; column 7, line 1, strike out "listing the type of photoconductive films as well as the" and insert instead -- composition of solutions used in the preparation of each --; column 8, line 54, for "radation" read -- radiation --; column 10, line 50, for "mutliple" read -- multiple --; column 11, lines 61 and 62, for "condutivity" read -- conductivity --; column 12, line 7, for "an" read -- as --; column 14, line 20, for "original" read -- originally --; line 35, after "and" insert a comma; column 15, line 6, for "substrated" read -- substrate --.

Signed and sealed this 12th day of January 1965.

(SEAL)
Attest:

ERNEST W. SWIDER                                  EDWARD J. BRENNER
Attesting Officer                                Commissioner of Patents